(12) United States Patent
Amano et al.

(10) Patent No.: US 9,046,934 B2
(45) Date of Patent: Jun. 2, 2015

(54) CONTROLLING ACCELERATION OF MOUSE CURSOR MOVEMENT BASED ON SCREEN SEGMENTS AND IMAGE FEATURES

(71) Applicant: International Business Machines Corporation, Armonk, NY (US)

(72) Inventors: Takehiko Amano, Kawasaki (JP); Yoshio Horiuchi, Kanagawa-ken (JP); Ken Kumagai, Edogawa-ku (JP)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 13/685,419

(22) Filed: Nov. 26, 2012

(65) Prior Publication Data
US 2013/0139097 A1    May 30, 2013

(30) Foreign Application Priority Data
Nov. 24, 2011    (JP) .................................. 2011-255934

(51) Int. Cl.
*G06F 3/00* (2006.01)
*G06F 3/033* (2013.01)
*G06F 3/038* (2013.01)
*G06F 3/0481* (2013.01)

(52) U.S. Cl.
CPC ................ *G06F 3/033* (2013.01); *G06F 3/038* (2013.01); *G06F 3/04812* (2013.01)

(58) Field of Classification Search
USPC ........................................................ 715/856
See application file for complete search history.

(56) References Cited

U.S. PATENT DOCUMENTS

| | | | | |
|---|---|---|---|---|
| 5,508,717 | A * | 4/1996 | Miller ........................... | 715/858 |
| 6,392,675 | B1 * | 5/2002 | Becker et al. ................. | 715/858 |
| 6,424,338 | B1 * | 7/2002 | Anderson ...................... | 345/173 |
| 6,466,199 | B2 * | 10/2002 | Takase et al. ................. | 345/159 |
| 6,628,315 | B1 * | 9/2003 | Smith Dawkins et al. ..... | 715/856 |
| 6,795,055 | B1 * | 9/2004 | Culler ........................... | 345/157 |
| 6,816,148 | B2 * | 11/2004 | Mallett et al. ................. | 345/157 |
| 8,355,838 | B2 * | 1/2013 | Itoh et al. ......................... | 701/36 |
| 8,429,541 | B1 * | 4/2013 | Wisneski et al. ............. | 715/751 |
| 8,482,521 | B2 * | 7/2013 | Abe et al. ...................... | 345/156 |

(Continued)

FOREIGN PATENT DOCUMENTS

| | | |
|---|---|---|
| JP | 05150899 | 6/1993 |
| JP | 9288544 A | 11/1997 |

(Continued)

OTHER PUBLICATIONS

Windows XP, Google Translate: How to Adjust the Acceleration of the Mouse Pointer in Windows XP, Last retrieved: Oct. 3, 2012.

*Primary Examiner* — Tadeese Hailu
*Assistant Examiner* — Andrew Chung
(74) *Attorney, Agent, or Firm* — Kunzler Law Group

(57) ABSTRACT

A method for controlling movements of a pointer through computer processing, where the pointer is displayed on a display device, includes the steps of: dividing a display area in which the pointer is movable into a predetermined number of regions, acquiring a current position of the pointer, determining in which of the divided regions the pointer is present (hereinafter referred to as a present region), computing a speed scale-factor for the pointer based on an image characteristic in the present region, and setting, as a moving speed in the present region, a normal moving speed of the pointer multiplied by the speed scale-factor.

20 Claims, 9 Drawing Sheets

(56) References Cited

U.S. PATENT DOCUMENTS

| | | | |
|---|---|---|---|
| 8,516,369 B2* | 8/2013 | Yoo et al. | 715/702 |
| 8,612,923 B2* | 12/2013 | Arora et al. | 716/139 |
| 8,619,052 B2* | 12/2013 | Benko et al. | 345/173 |
| 2003/0016252 A1* | 1/2003 | Noy et al. | 345/856 |
| 2004/0017355 A1* | 1/2004 | Shim | 345/157 |
| 2007/0079246 A1* | 4/2007 | Morillon et al. | 715/741 |
| 2007/0247435 A1* | 10/2007 | Benko et al. | 345/173 |
| 2008/0168364 A1* | 7/2008 | Miller et al. | 715/762 |
| 2008/0222523 A1* | 9/2008 | Fox et al. | 715/701 |
| 2008/0244462 A1* | 10/2008 | Kim et al. | 715/856 |
| 2009/0037840 A1* | 2/2009 | Chen | 715/784 |
| 2010/0322523 A1* | 12/2010 | Mitsuhashi et al. | 382/218 |
| 2011/0041085 A1* | 2/2011 | Hardebeck et al. | 715/753 |

FOREIGN PATENT DOCUMENTS

| | | |
|---|---|---|
| JP | 10040018 | 2/1998 |
| JP | 11085402 | 3/1999 |
| JP | 2000057094 | 2/2000 |
| JP | 2000148350 | 5/2000 |
| JP | 2001005612 | 1/2001 |
| JP | 2001056729 | 2/2001 |
| JP | 2004005592 | 1/2004 |
| JP | 2009258896 | 11/2009 |
| JP | 2010182287 A | 8/2010 |

* cited by examiner

CONTROLLING ACCELERATION OF MOUSE CURSOR MOVEMENT BASED ON SCREEN SEGMENTS AND IMAGE FEATURES

CROSS-REFERENCE TO RELATED APPLICATIONS

This patent application incorporates by reference Japanese Patent Application No. 2011-255934 filed on Nov. 24, 2011 for International Business Machines, where the entire contents of which are incorporated herein by reference for all purposes.

FIELD

The subject matter disclosed herein relates to controlling pointer movements and in particular to a technique of changing the moving speed of a pointer.

BACKGROUND

Description of the Related Art

In recent years, more and more monitors (displays) have wider screens. Such monitors have a problem with the speed and distance of the movement of the pointer (or the pointing device such as a mouse). There is a demand for a technique of efficiently moving the pointer to a user's desired point.

In general, there are a variety of images including objects, texts and pictures on the screen. The characteristics of these images can be effectively used to efficiently move the pointer.

Japanese Patent JP1997-0288544A discloses a technique of enabling quick pointer movement by interpreting on which element on the screen the pointer is located when the mouse is clicked and moving the pointer to a predetermined target point of pointer movement in accordance with the direction of the movement of the mouse.

Japanese Patent JP2009-0258896A discloses a method for quick pointer movement based on two-phase cursor movement. According to this technique, a touch-pad screen is divided into a plurality of regions. When a divided region is selected by a user touching therewith with a finger or the like, the cursor moves to the divided region, and then, the user moves the pointer in the region with a mouse.

BRIEF SUMMARY

The technique of Japanese Patent JP1997-0288544A requires predetermining the target point of mouse movement. In addition, the technique does not allow moving the mouse to an arbitrary point. The technique of Japanese Patent JP2009-0258896A is disadvantageous from the viewpoint of human engineering because of the discrete cursor movements resulting from the two-step selection. Therefore, an object of the present invention is to provide a method and apparatus for controlling pointer movements for an efficient movement of a pointer to a target position.

Another object is to provide a method and apparatus for controlling pointer movements for an easy and smooth movement of the pointer to a target position. Yet another object is to provide a method and apparatus for controlling pointer movements according to characteristics of an image on which the pointer is present. Yet another object is to provide a method and apparatus for controlling pointer movements according to a pointer-speed scale-factor arbitrarily defined by a user.

In order to attain the objects described above, the present invention provides the following embodiments. The present invention provides a method for controlling movements of a pointer through computer processing, the pointer being displayed on a display device, comprising the steps of: dividing a display area in which the pointer is movable into a predetermined number of regions, acquiring a current position of the pointer, determining in which of the divided regions the pointer is present (hereinafter referred to as a present region), computing a speed scale-factor for the pointer based on an image characteristic in the present region, and setting, as a moving speed in the present region, a normal moving speed of the pointer multiplied by the speed scale-factor.

In one embodiment, the image characteristic is a histogram distribution of an image in the present region, a high frequency component of the image in the present region, the number of text characters displayed in the present region and/or the number of objects displayed in the present region. In another embodiment, the method includes the step of displaying a window for selecting any one of, or any combination of, the histogram distribution of the image in the present region, the high frequency component of the image in the present region, the number of text characters displayed in the present region and the number of objects displayed in the present region. In another embodiment, the method includes the step of asymptotically bringing the moving speed of the pointer to the moving speed in the present region in a case where the moving speed of the pointer in a region the pointer has been present before entering the present region differs from the moving speed in the present region.

In one embodiment, the method includes the step of visualizing the speed scale-factors in the predetermined number of regions and displaying the speed scale-factors. In another embodiment, the step of visualizing and displaying the speed scale-factors is a step of changing a display attribute in accordance with the magnitude of the speed scale-factor. In another embodiment, the method includes the step of changing the speed scale-factor in response to an instruction from a user. In another embodiment, the method includes the step of detecting a current direction of movement of the pointer, in which the step of changing the display attribute comprises the step of determining a position the pointer moving at the current pointer moving speed from the current position is reachable in a predetermined time and a region containing the position and displaying a shortest route to the reachable position in the region in the form of a line segment.

According to another aspect, an embodiment of the present invention provides an apparatus for controlling movements of a pointer displayed on a display device, comprising area dividing means for dividing a display area in which the pointer is movable into a predetermined number of regions, pointer position acquiring means for acquiring a current position of the pointer, region image characteristic acquiring means for determining in which of the divided regions the pointer is present and acquiring an image characteristic in the determined present region, and moving speed computing means for computing a speed scale-factor for the pointer based on the image characteristic and setting, as a moving speed in the present region, a normal moving speed of the pointer multiplied by the speed scale-factor.

In one embodiment, the image characteristic is a histogram distribution of an image in the present region, a high frequency component of the image in the present region, the number of text characters displayed in the present region and/or the number of objects displayed in the present region. In another embodiment, the apparatus includes means for displaying a window for selecting any one of, or any combination of, the histogram distribution of the image in the present region, the high frequency component of the image in the present region, the number of text characters displayed in the present region and the number of objects displayed in the present region. In another embodiment, the apparatus includes means for asymptotically bringing the moving speed of the pointer to the moving speed in the present region in a case where the moving speed of the pointer in a region the pointer has been present before entering the present region differs from the moving speed in the present region.

In one embodiment, the apparatus includes means for visualizing the speed scale-factors in the predetermined number of regions and displaying the speed scale-factors. In another embodiment, the means for visualizing and displaying the speed scale-factors is means for changing a display attribute in accordance with the magnitude of the speed scale-factor. In another embodiment, the apparatus includes change accepting means for changing the speed scale-factor in response to an instruction from a user. In another embodiment, the apparatus includes means for detecting a current direction of movement of the pointer, in which the means for changing the display attribute comprises means for determining a position the pointer moving at the current pointer moving speed from the current position is reachable in a predetermined time and a region containing the position and displaying a shortest route to the reachable position in the region in the form of a line segment.

According to another aspect, an embodiment of the present invention includes a computer program that makes a computer perform each step in the method described above. According to various embodiments of the present invention, a pointer can be efficiently moved. More specifically, the moving speed of the pointer is controlled in accordance with the image characteristics of the region in which the pointer is present and can also be adjusted in accordance with a user definition. Thus, movements of the pointer can be controlled in a more preferred manner from the viewpoint of human engineering.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Figure 1:
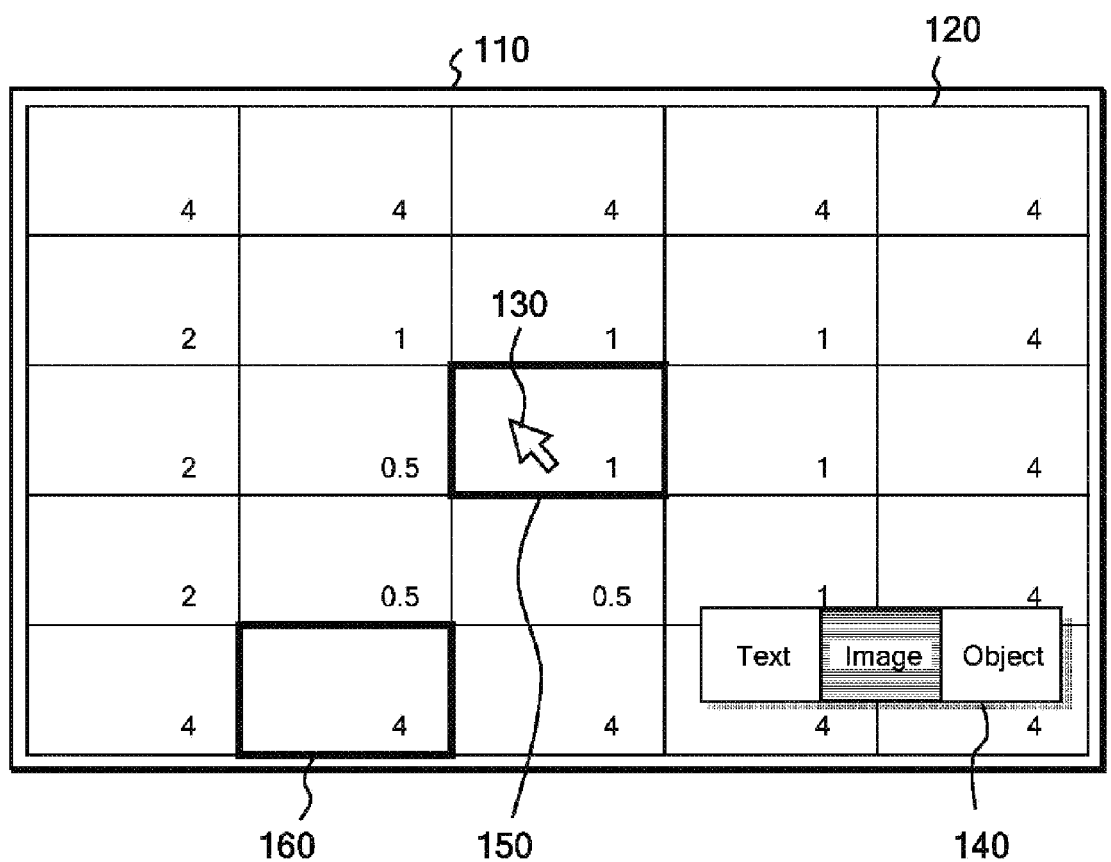
FIG. 1 is a schematic diagram for illustrating a method of controlling movements of a pointer.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product via shared execution, transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In one embodiment, the service provider requests payment directly from a customer account at a banking or financial institution. In another embodiment, if the service provider is also a customer of the customer that uses the computer program product, the payment owed to the service provider is reconciled to the payment owed by the service provider to minimize the transfer of payments.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, hardware, or portion of code, which comprises one or more executable instructions of the program code for implementing the specified logical function(s).

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment. The description of elements in each figure may refer to elements of proceeding figures. Like numbers refer to like elements in all figures, including alternate embodiments of like elements.

In the following, embodiments of the present invention are described. However, the present invention is not limited to the embodiments described below. Of course, a pointer movement control according to an embodiment can be applied not only to a computer display but also to any display device that displays a pointer, such as a television screen, a projector, a presentation apparatus, a cellular phone and a game machine.

FIG. 1 is a schematic diagram showing a method for controlling movements of a pointer according to an embodiment of the present invention. A display device (monitor) 110 has a display area 120 in which a pointer 130 can be moved, and a text, an image, an object or the like is displayed in the display area 120. In one embodiment, the display area 120 is divided into a plurality of invisible regions, and the moving speed of the pointer is determined for each region.

Typically, a user moves the pointer 130 using pointer moving means, such as a mouse and/or a keyboard. In one embodiment, the moving speed of the pointer 130 depends on the speed scale-factor set for the region in which the pointer 130 is present.

For example, if the pointer 130 is present in a region 150, the moving speed of the pointer may be 50×1=50 (inches/second), provided that a normal moving speed of the pointer is 50 (inches/second). As depicted, if the pointer 130 is present in a region 160, the moving speed of the pointer is 50×4=200 (inches/second). In this way, the moving speed of the pointer is computed by multiplying the normal speed of the pointer by the speed scale-factor set for the region in which the pointer is present (referred to as a present region).

Although the unit of the speed of the pointer is inches/second in the above example, the unit may be dots/second, pixels/second, or another unit speed. The unit of the speed of the pointer may be any unit speed.

In one embodiment, the display area 120 is divided into a plurality of areas. For example, one region may have a size of 64 by 64 pixels. Other sizes are possible, but a size that is a product of multiples of 8 may be desirable in some embodiments because discrete cosine transform ("DCT") may be used. Alternatively, the size of each region may be variable depending on an image characteristic in the entire display area 120.

The speed scale-factor, in one embodiment, is computed from the image characteristics in the divided region. Therefore, the speed scale-factor may differ among the regions. In one embodiment, image characteristics may include a histogram distribution of the image, a high frequency component of the image, the number of characters of a text and/or the number of objects.

In the depicted embodiment, a pointer control panel 140 is displayed in the display area 120. The panel 140, in one embodiment, is a panel that allows the user to select which of the image characteristics described above is to be used. In the example shown in FIG. 1, "Image" is currently selected. In the depicted embodiment, selecting "Image" means that a gray scale distribution of the image is selected as an image characteristic. In the practical examples of the present invention, two specific examples of "Image" will be described: a histogram distribution of an image and a high frequency component of an image.

Figure 2:
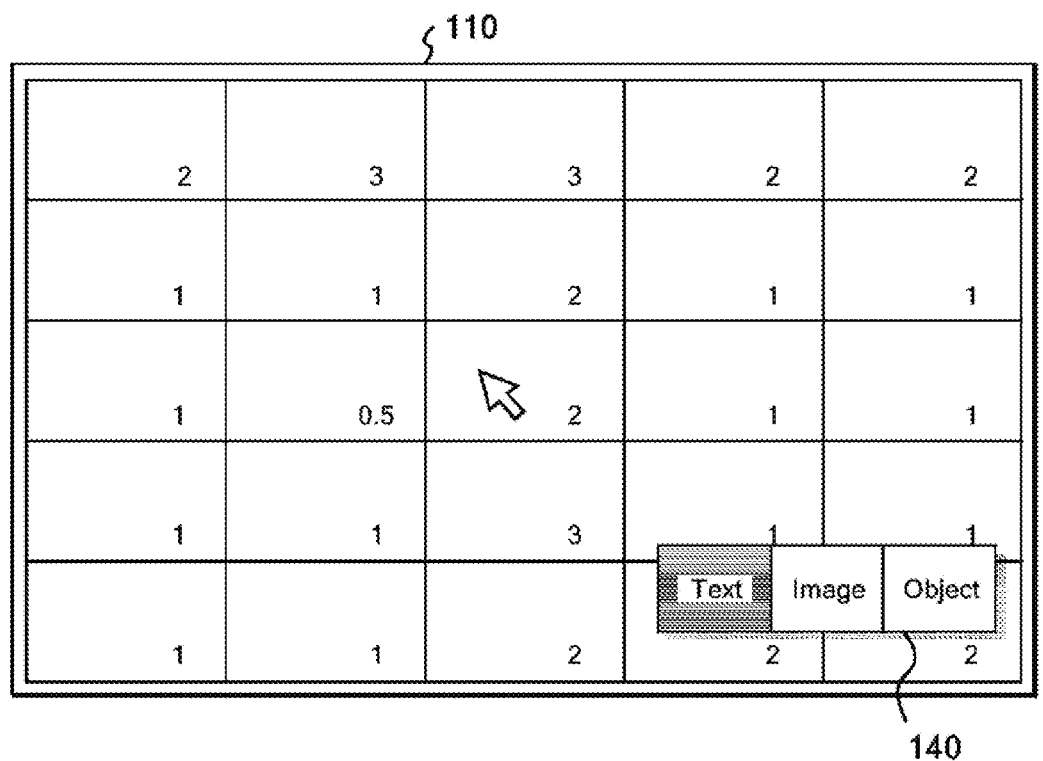
FIG. 2 is a diagram showing a case where the number of text characters is selected as an image characteristic.

In one embodiment, selecting "Text" in the pointer control panel 140 means that the number of text characteristics is selected as an image characteristic, as shown in FIG. 2. Similarly, in another embodiment, selecting "Object" means that the number of objects is selected as an image characteristic.

In the following practical example, a case where one image characteristic is selected will be described. However, a plurality of image characteristics may be selected, and the speed scale-factor may be determined from the combination of the image characteristics. For example, the speed scale-factor may be computed from a combination of image characteristics differently weighted.

The pointer control panel 140 can be moved to a desired position through a pointer selection manipulation and, in one embodiment, can be displayed and hidden in the display area 120 through a predetermined key manipulation (pressing the Ctrl, ALT and F7 keys at the same time, for example). In another embodiment, the pointer control panel 140 can also be continually displayed in the display area 120.

Figure 3:
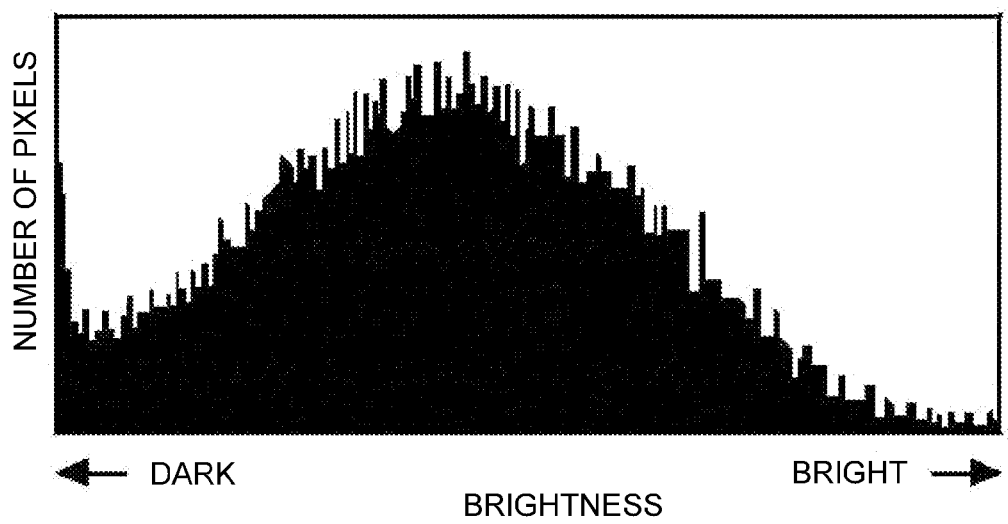
FIG. 3 is a diagram for illustrating a histogram of an image.

FIG. 3 is a diagram for illustrating a histogram of an image. The histogram (referred to also as a frequency distribution diagram) is typically a diagram that shows a distribution of the brightness (the degree of the contrast) of an image. In FIG. 3, the horizontal axis indicates the brightness, the vertical axis indicates the number of pixels, pixels shown leftward being darker (more blackish), and pixels shown rightward being brighter (more whitish). Thus, the image becomes darker (more blackish) as the peak of the pixels tilts leftward and becomes brighter (more whitish) as the peak of the pixels tilts rightward. In the case of a color image, in addition to the histogram of brightness, a histogram of each color (RGB) may be computed. In the case of a color image, the histogram of brightness represents the degree of contrast of the combination of the colors.

In the case where each region has a size of 64 by 64 pixels, a histogram for 4096 pixels may be determined. That is, a distribution of brightness that indicates how many dots there are and how bright those dots are is determined. In one embodiment of the present invention, the speed scale factor is an inverse of the standard deviation multiplied by a constant. If the standard deviation is 0, the speed scale-factor assumes a predetermined maximum value. For example, in case of a monotone image, if 4096 pixels are evenly distributed over 0 to 255 brightness, the speed scale-factor assumes the maximum value, and the speed scale-factor decreases as the dispersion of the pixels increases. In the case of a color image, the standard deviation is determined from a combination of the distributions for the R, G and B colors, and the speed scale-factor is determined by multiplying the inverse of the standard deviation by an integer.

Figure 4:
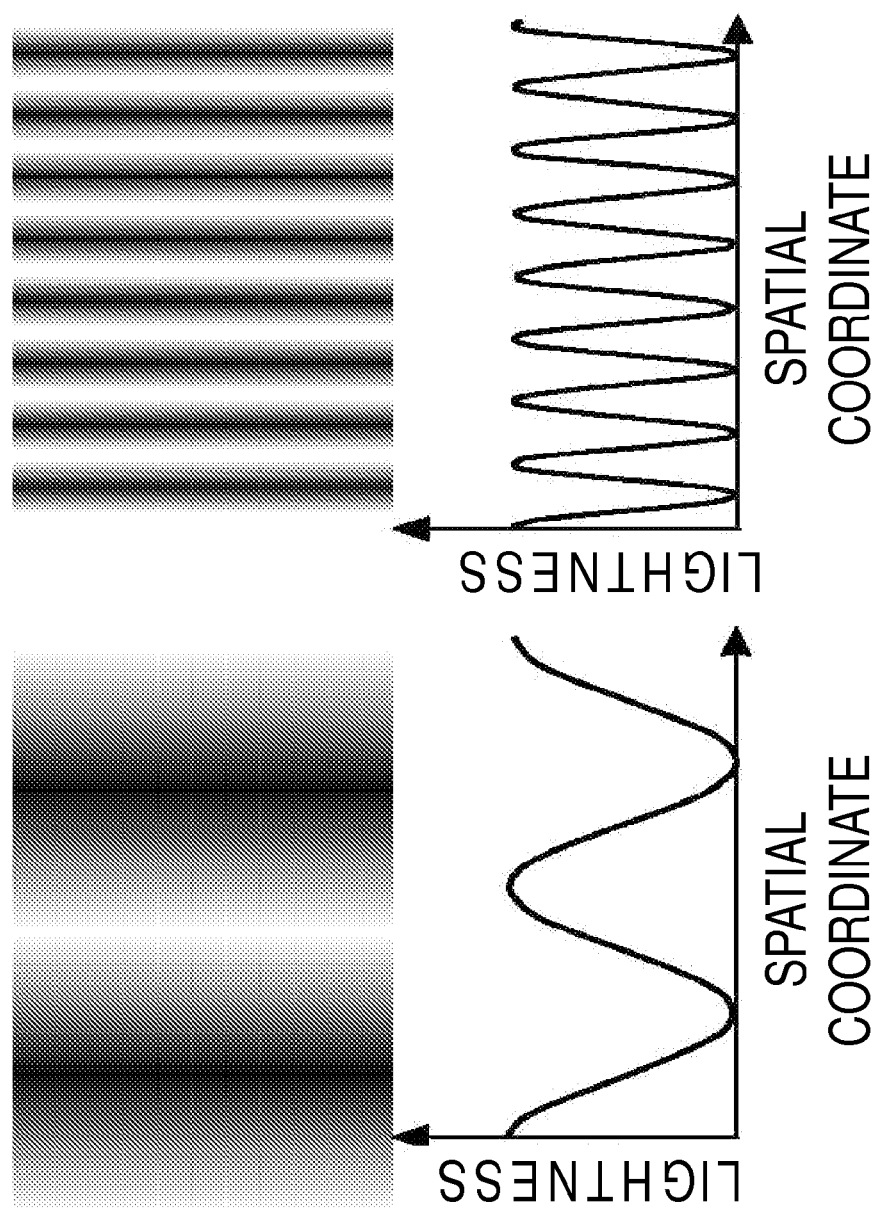
FIG. 4 is a diagram for illustrating a high frequency component of an image.

FIG. 4 is a diagram for illustrating a high frequency component of an image. As can be seen from FIG. 4, the lightness alternately varies (or in other words, white and black alternately occurs). The variation may be a wave, so that a concept of wave can be applied to the image. The frequency of the wave may be referred to as a spatial frequency. The spatial frequency, in one embodiment, is a quantity that indicates the degree of fineness of the periodic structure of the image. The left half of FIG. 4 shows an image having a low spatial frequency, in which wide black and white areas alternately occur, and the right half of FIG. 4 shows an image having a high spatial frequency, in which narrow black and white areas alternately occur. An image having a uniform color has a spatial frequency of 0.

A high frequency component can be extracted by Fourier transform or discrete cosine transform ("DCT"), which is applied to a JPEG image (Joint Photographic Expert Group image). In this DCT method, a particular frequency can be separately extracted by a frequency analysis of image gray scale information or image shape information defined by the edge of the image. As an alternative, a wavelet transform can also be used. A particular frequency component can be separately extracted by performing a local frequency analysis on a spatially varying waveform using a waveform (wavelet) having an average value of 0 and a finite support.

For example, in the case where DCT is used, provided that each region has a size of 64 by 64 pixels, the region is divided into blocks having a size of 8 by 8 dots and thus broken down into 64 cosine curves, thereby being transformed into data that indicates the ratio between the high frequency components and the low frequency components. This method is well-known and thus will not be further described. If the ratio of the high frequency components to the low frequency components is 6 to 4, the speed scale-factor for the region is 6/4=1.5.

Figure 5:
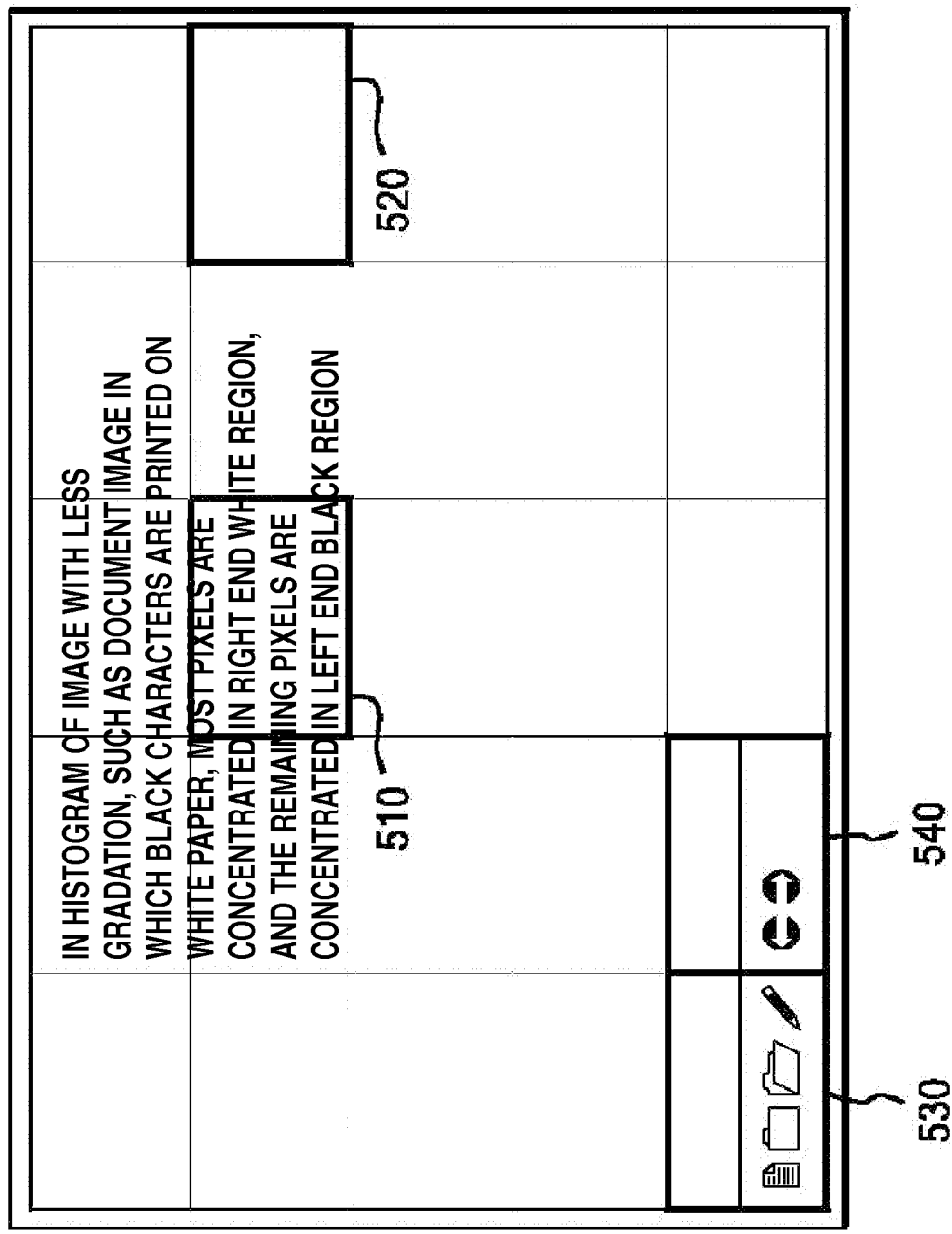
FIG. 5 is a diagram for illustrating the number of text characters and the number of objects.

FIG. 5 is a diagram for illustrating the number of text characters and the number of objects. In general, the speed scale-factor is set to be lower in regions that contain more text characters and higher in regions that contain less text characters. For example, the maximum speed scale-factor may be set to 4, and the relative ratio may be set to 10, which is the reference number of text characters. Where the number of characters is zero, the speed scale-factor may be set to be 4, which is the maximum speed scale-factor. If 20 text characters are present, as in a region 510 in FIG. 5, the speed scale-factor may be 10/20=0.5. A region 520, for example, contains no (zero) text characters, so that the speed scale-factor for the region 520 is 4.

In one embodiment, objects are graphical objects that are selected with a pointer, a cursor or the like to activate the respective allocated functions. For example, the objects may include icons, menus, list boxes, radio buttons, and the like.

In FIG. 5, objects are displayed in lower regions 530 and 540. The same theory for the text characters, in one embodiment, may be applied to the objects. The speed scale-factor may be set to be lower in regions containing more objects and higher in regions containing less text characters. For example, the maximum speed scale-factor may be set to 4 and the relative ratio may be set to 3, which is a reference number of objects. If the number of objects is zero, the speed scale-factor may be set to be 4, which is the maximum speed scale-factor. Where 4 objects are present in the region 530 in FIG. 5, the speed scale-factor may be calculated to be 3/4=0.75. The region 540 contains two objects, so that the speed scale-factor for the region 520 may be calculated to be 3/2=1.5.

Figure 6:
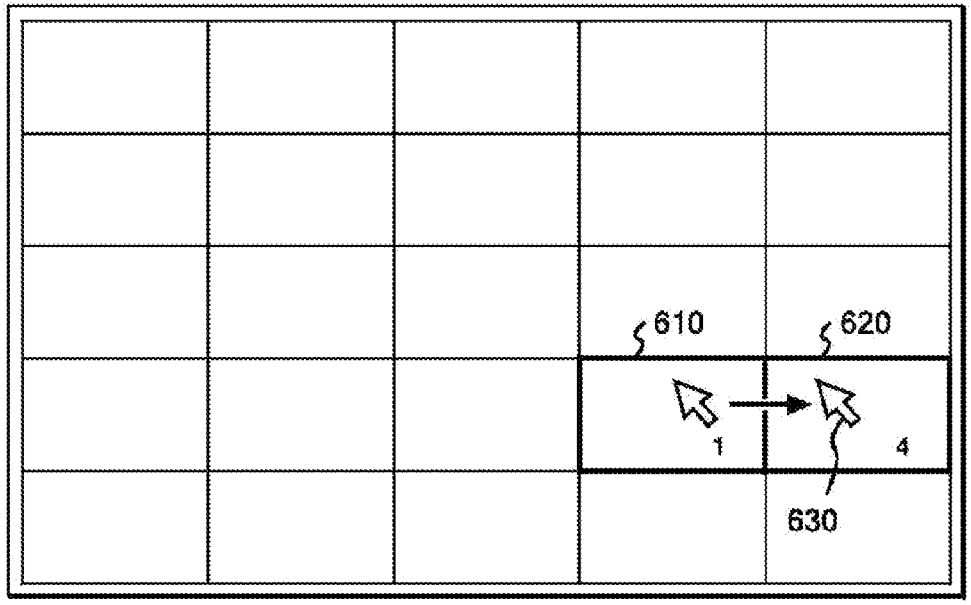
FIG. 6 is a diagram for illustrating asymptotic computation of the moving speed of the pointer.

FIG. 6 is a diagram for illustrating asymptotic computation of the moving speed of a pointer. In one embodiment, a pointer 630 is present in a region 610 for which the speed scale-factor is set to be 1, and the user moves the pointer 630 to a region 620 for which the speed scale-factor is set to be 4. Provided that the normal moving speed is 100, it may not be preferable from the viewpoint of human engineering that the moving speed of the pointer 630 instantaneously increases from 100 to 400 when the pointer 630 enters the region 620. Thus, the moving speed of the pointer may be asymptotically smoothly increased from 100 to 400. This may prevent the user from feeling uncomfortable due to the abrupt speed change of the pointer moving from one region to another.

Figure 7:
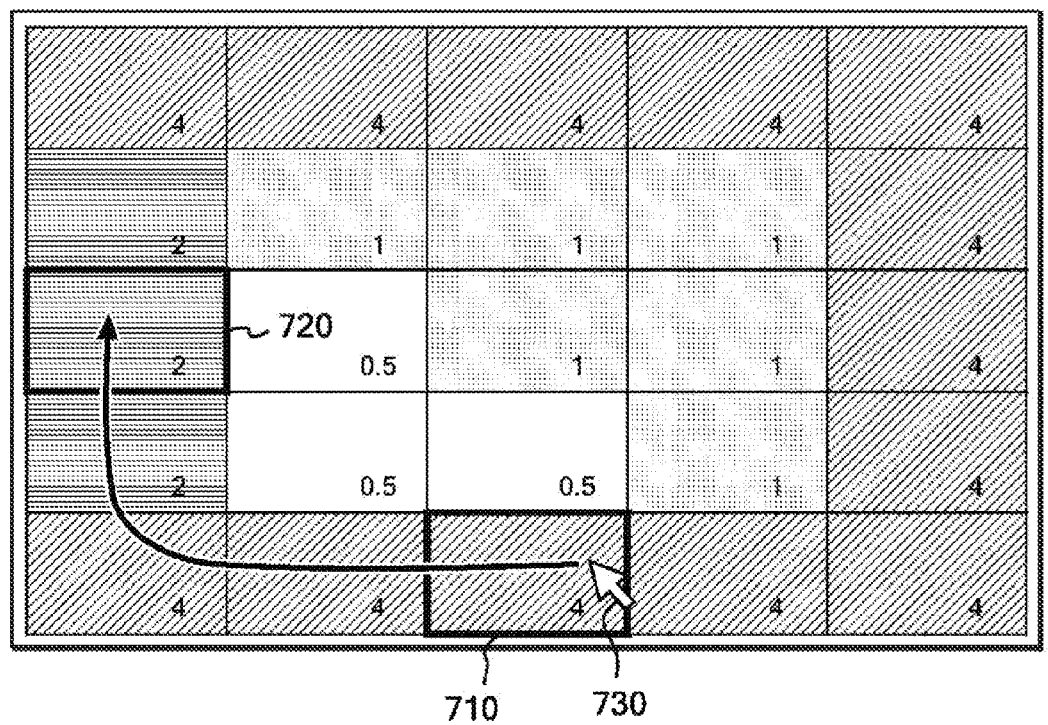
FIG. 7 is a diagram illustrating a shortest route displayed in the form of a line segment.

FIG. 7 is a diagram for illustrating a case where a pointer 730 is present in a region 710, and the user is to move the pointer in a particular direction (toward an upper left part in the example in FIG. 7). In one embodiment, the moving direction and speed at the initial phase of the operation are detected, the position the pointer moving at the current speed will reach in a particular time and the region containing the position are determined, and the route along which the pointer can reach the position in the region in the shortest time is displayed in the form of a line segment.

As can be seen from FIG. 7, the regions in the display area 120 have a gray scale. This is an approach to visually indicate which region has a high pointer speed scale-factor for the convenience of users. Visualization of the speed scale-factor can be achieved by displaying the value of the speed scale-factor itself in each region or changing the attribute of the display, such as color, brightness and the way of blinking. In one embodiment, the variations in speed scale-factor are shown by a gray scale of the color, or more specifically, blue. A darker blue indicates a higher speed of the pointer, and a lighter blue indicates a lower speed of the pointer. Visualization of the speed scale-factor, in one embodiment, is turned on and off through a predetermined key manipulation.

Figure 8:
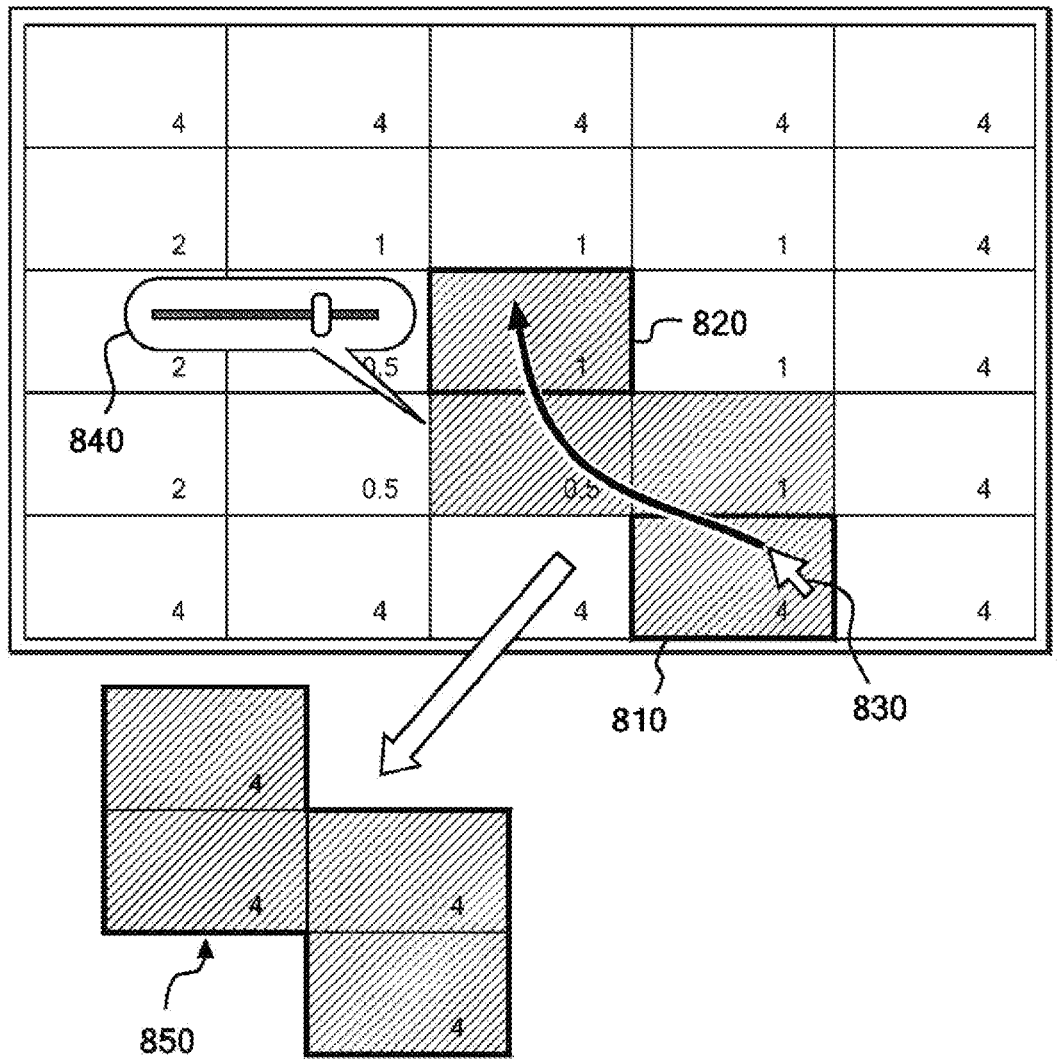
FIG. 8 is a diagram for illustrating rewrite of a speed scale-factor.

FIG. 8 is a diagram for illustrating rewrite of the speed scale-factor. Although the speed scale-factor may be specifically determined for a particular image, fine adjustments are sometimes desired depending on the operating environment of each user. Thus, a mechanism that allows rewrite of the speed scale-factor is introduced.

In FIG. 8, if a user moves a pointer 830 from a region 810 to a region 820 and wants to move the pointer 830 at a higher or lower speed in the next movement, the user may change the speed scale-factor for each region in a sub-area 850 by manipulating a slide bar 840, which is a speed scale-factor changing user interface. According to the present invention, the speed scale-factor increases as the slider moves to the right. In FIG. 8, the speed scale-factor is set to be a maximum speed scale-factor 4 for all the regions in the sub-area 850. If the target region 820 and the movement route to the region 820 have already been given or can be estimated when the pointer 830 is still present in the region 810, the speed scale-factor for the relevant regions can be changed with the slide bar 840 before the pointer is actually moved. In one embodiment, the slide bar for changing the speed scale-factor may be displayed or hidden through a predetermined key manipulation.

Figure 9:
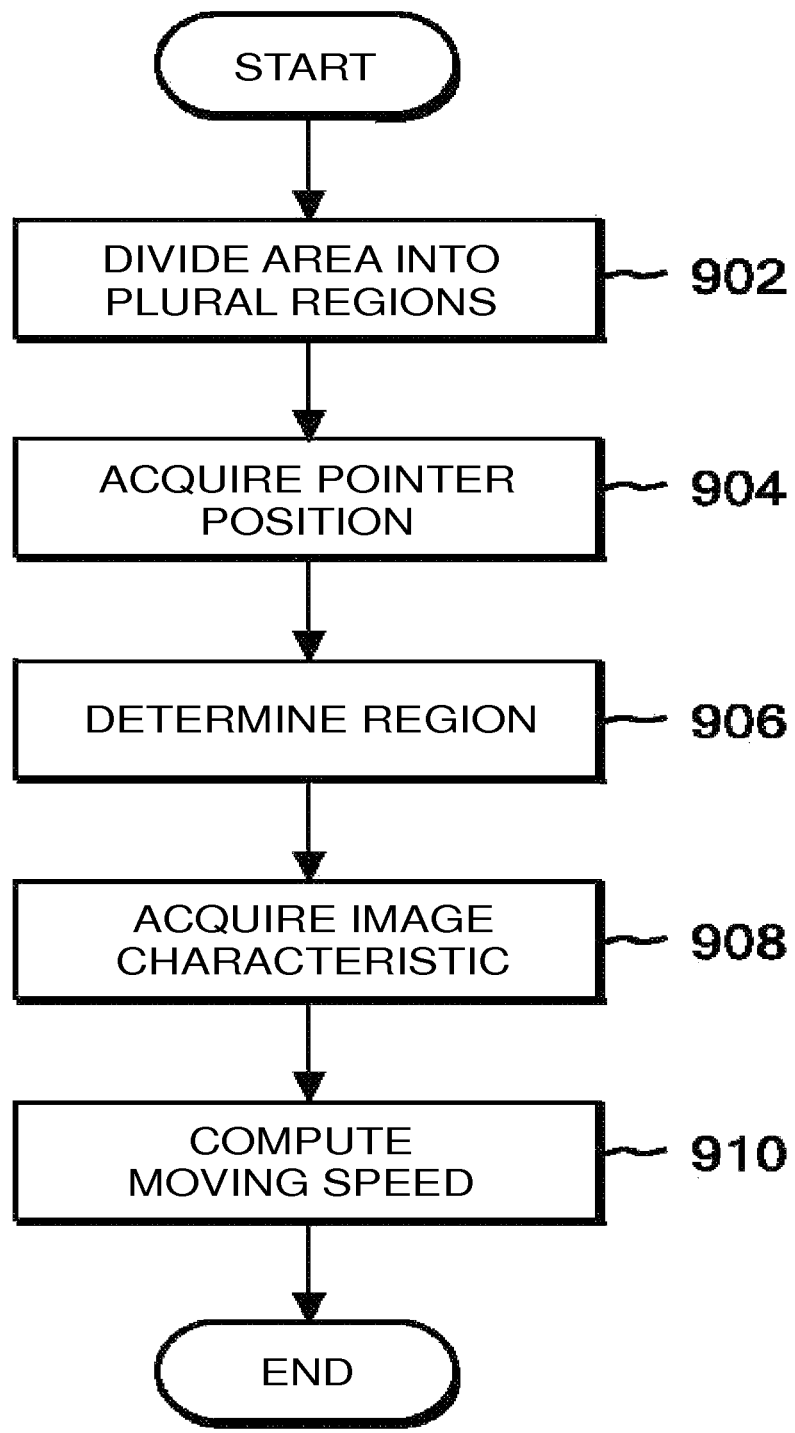
FIG. 9 is a flowchart of computation of the moving speed.

FIG. 9 is a flowchart showing a computation of the moving speed according to a practical example of the present invention. First, in Step 902, the display area 120 is divided into a predetermined number of regions. Then, in Step 904, the current position of the pointer in the display area 120 is acquired. Then, in Step 906, in which of the divided regions the pointer is present (present region) is determined from the position of the pointer. Then, in Step 908, an image characteristic in the present region is computed to determine the value thereof. Finally, in Step 910, the speed scale-factor is computed based on the image characteristic, and the moving speed of the pointer is determined by multiplying the normal speed of the pointer by the computed speed scale-factor.

Although the image characteristic in Step 908 can be computed in real time using hardware, the image characteristic can also be computed by software processing because many recent personal computers have quite high-speed CPUs. In a case where a low-speed CPU is used in moving the pointer, the image characteristic for the regions may be computed in advance in Step 902, the speed scale-factor based on the image characteristic may be stored in advance, and when the pointer is moved, the moving speed may be immediately computed by reading the speed scale-factor allocated to the relevant regions.

Figure 10:
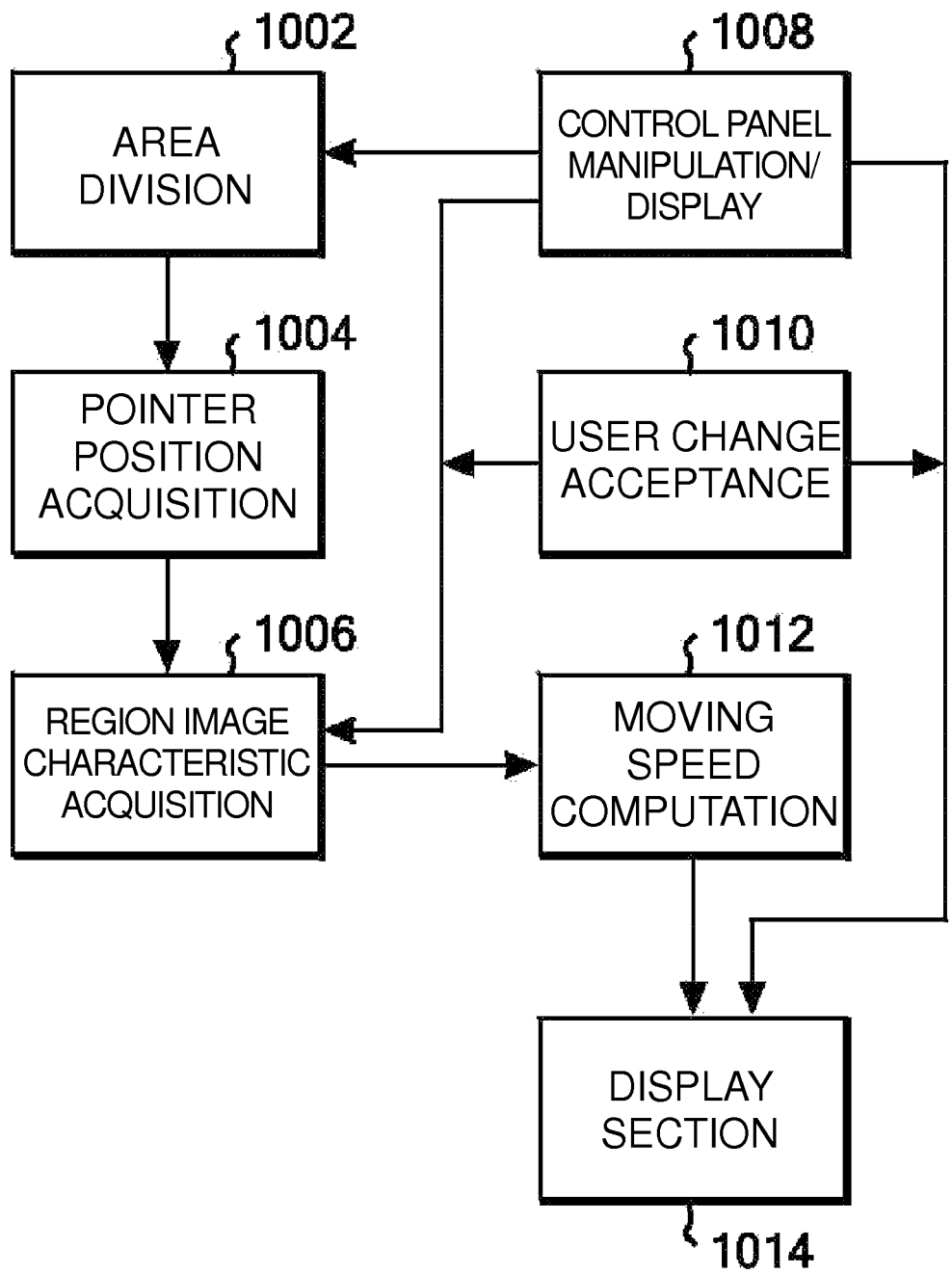
FIG. 10 is a functional block diagram for illustrating the computation of the moving speed.

FIG. 10 is a functional block diagram for illustrating the computation of the moving speed according to one embodiment of the present invention. An area dividing section 1002 may divide the display area 120 into a predetermined number of regions. In one embodiment, the display area 120 is divided into regions each having a size of 64 by 64 pixels. A pointer position acquiring section 1004 may determine the current position of the pointer in the display area 120. A region image characteristic acquiring section 1006 may determine in which of the divided regions the pointer is present from the position of the pointer and may acquire the image characteristic in the present region.

A moving speed computing section 1012 may compute the speed scale-factor based on the acquired image characteristic and determines the moving speed of the pointer in the region by multiplying the normal moving speed of the pointer by the speed scale-factor. A display section 1014 may display the pointer moving at the determined moving speed.

A control panel manipulation/display section 1008 may be activated by a predetermined key manipulation to enable manipulation of the control panel. The control panel manipulation/display section 1008 may inform the region image characteristic acquiring section 1006 of which type of image characteristic (text, image or object) is selected. The control panel manipulation/display section 1008 may also inform the display section 1014 of the selected type of image characteristic and what is displayed on the control panel manipulation/display section 1008.

In one embodiment, the control panel manipulation/display section 1008 allows the area dividing section 1002 to independently change the size of each region. This allows the display area 120 to be divided so as to conform more closely to the operating environment of each user. Although no user interface for size change is shown, a variety of operations, such as inputting a numerical value and displacing a line segment defining a region with a pointer, are possible.

A user change accepting section 1010 may be activated by a predetermined key manipulation to enable the user to perform a fine adjustment of the speed scale-factor based on the image characteristic. More specifically, the user change accepting section 1010 may display the slide bar 840 in the region in which the pointer is present to allow the user to change the speed scale-factor based on the image characteristic.

Figure 11:
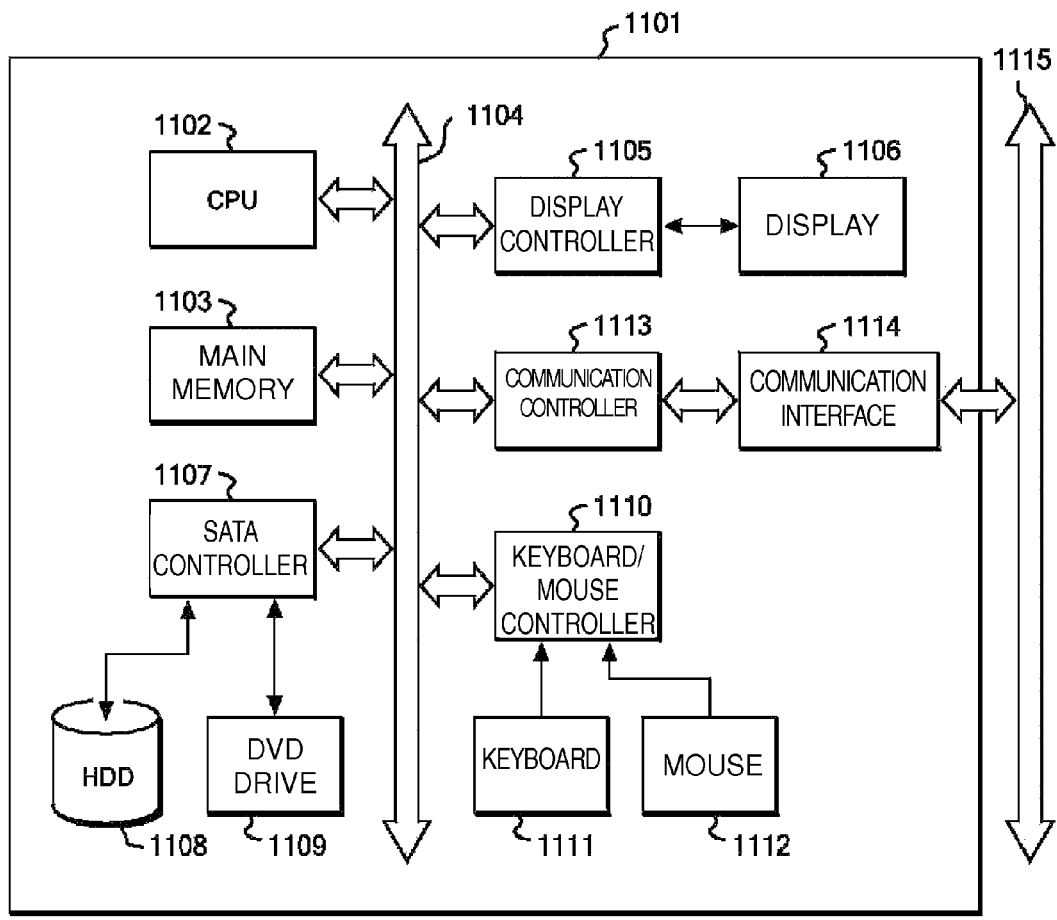
FIG. 11 is a block diagram showing an example of computer hardware.

FIG. 11 is a block diagram showing an example of computer hardware used for the pointer movement control according to the present invention. A computer apparatus (1101) according to an embodiment of the present invention includes a central processing unit ("CPU") (1102) and a main memory (1103), which are connected to a bus (1104). The CPU (1102) may be based on a 32-bit or 64-bit architecture and may be of the Xenon® series, Core™ series, Atom™ series, Pentium® series or Celeron® series available from Intel Corporation or of the Phenom™ series, Athlon™ series, Turion™ series or Sempron™ series available from AMD, Inc.

To the bus (1104), a display (1106) corresponding to the display device 110, such as a liquid crystal display ("LCD") monitor, may be connected via a display controller (1105). The display (1106) may be used to display an application and the movement of the pointer according to the present invention. To the bus (1104), a hard disk or silicon disk (1108) and a compact disk read only memory ("CD-ROM") or digital video disk ("DVD") drive or a Blu-ray Disk™ drive (1109) may also be connected via an Integrated Drive Electronics ("IDE") or Serial Attachment Packet Interface ("SATA") controller (1107).

A program according to an embodiment of the present invention and data on the image characteristic values, the speed scale-factors based on the image characteristic values and the moving speeds may be stored in the storage devices described above. The program and data according to the present invention are preferably stored in the hard disk (1108) or the main memory (1103) and executed by the CPU (1102) to perform the pointer movement control.

The CD-ROM or DVD drive or the Blu-ray Disc™ drive (1109) may be used as required for installing the program according to the present invention from a computer-readable medium, such as a CD-ROM, DVD-ROM or Blu-ray disc, into the hard disk or reading data therefrom. To the bus (1104), a keyboard (1111) and a mouse (1112) for moving the pointer, which are targets of the pointer movement control according to the present invention, may also be connected via a keyboard/mouse controller (1110).

The pointer displayed on the display (1106) may be moved by moving the mouse (1112). The pointer control panel 140 according to the present invention may be displayed on the display (1106) by a predetermined key entry on the keyboard (1111). Similarly, the slide bar 840 that allows speed scale-factor change may be displayed on the display (1106) by another predetermined key entry on the keyboard (1111).

A communication interface (1114) may be included that complies with an Ethernet (trademark) protocol, for example. The communication interface (1114) may be connected to the bus (1104) via a communication controller (1113), may serve to physically connect the computer apparatus and a communication line (1115) to each other, and may provide a network interface layer for a TCP/IP communication protocol of a communication function of an operating system of the computer. Data on the image characteristic values, the speed scale-factors and the moving speeds for an external display may be read via the communication line and processed by the CPU (1102).

A program for controlling movements of a pointer according to the present invention may be a machine-executable program described in a programming language, such as C++, Java™, JavaBeans®, Java® Applet, Java Script®, Perl and Ruby. The program may be stored in a computer-readable recording medium and distributed or transmitted.

Although specific embodiments and practical examples of the present invention have been described, the present invention is not limited to these specific embodiments and practical examples, and various additions, modifications or deletions are possible that can be contemplated by those skilled in the art.

In the practical examples described above, in general, the pointer is advantageously moved at a low speed if the image in the present region is fine or complicated and otherwise moved at a high speed. However, depending on the operating environment or the style of working of the user, the moving speed of the pointer can be controlled in the opposite way. In that case, in computation of the speed scale-factor from the image characteristic, the inverse of the speed scale-factor can also be computed. Any implementations that have the effects and advantages of the present invention are included in the scope of the present invention.

REFERENCE SIGNS LIST

110—display device
120—display area
140—panel
140—pointer control panel
150, 160, 510, 520, 530, 540, 610, 620, 710, 810, 820, 850—region
130, 630, 730, 830—pointer
840—slide bar
1002—area dividing section
1004—pointer position acquiring section
1006—region image characteristic acquiring section 1008—display section
1010—user change accepting section
1012—moving speed computing section
1014—display section The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
    dividing a display area in which a pointer is movable into a predetermined number of regions, the pointer being displayed in the display area on an electronic display device through a computer process;
    acquiring a current position of the pointer within the display area;
    determining in which of the divided regions of the display area the pointer is present (hereinafter referred to as a present region);
    calculating, for each region, a speed scale-factor for the pointer based on an image characteristic of the portion of the image displayed within the region, wherein the image characteristic of the portion of the image presently displayed within a region is used in the calculation of the speed-scale factor for the region; and
    setting, as a moving speed in the present region, a normal moving speed of the pointer multiplied by the speed scale-factor of the present region, wherein the moving speed of the pointer for each region is the normal moving speed multiplied by the speed scale-factor.

2. The method according to claim 1, wherein the image characteristic is one or more of a histogram distribution of an image in the present region, a high frequency component of the image in the present region, the high frequency component determined using a discrete cosine transformation ("DCT"), the number of text characters displayed in the present region and the number of objects displayed in the present region.

3. The method according to claim 2, further comprising the step of:
    displaying a window for selecting as the image characteristic one or more of the histogram distribution of the image in the present region, the high frequency component of the image in the present region, the number of text characters displayed in the present region and the number of objects displayed in the present region.

4. The method according to claim 1, further comprising:
    asymptotically bringing the moving speed of the pointer to the moving speed in the present region in a case where the moving speed of the pointer in a region the pointer has been present before entering the present region differs from the moving speed in the present region.

5. The method according to claim 1, further comprising:
    visualizing the speed scale-factors in the predetermined number of regions and displaying the speed scale-factors.

6. The method according to claim 5, wherein the step of visualizing and displaying the speed scale-factors is a step of changing a display attribute in accordance with the magnitude of the speed scale-factor.

7. The method according to claim 6, further comprising: changing the speed scale-factor in response to an instruction from a user.

8. The method according to claim 6, further comprising:
    detecting a current direction of movement of the pointer,
        wherein the step of changing the display attribute comprises determining a position the pointer moving at the current pointer moving speed from the current position is reachable in a predetermined time and a region containing the position and displaying a shortest route to the reachable position in the region in the form of a line segment.

9. The method of claim 1, further comprising changing the speed scale-factor in response to an instruction from a user.

10. The method of claim 1, wherein dividing the display area into a predefined number of regions further comprises dividing the display area into equally sized regions.

11. An apparatus for controlling movements of a pointer displayed on a display device, comprising:
    area dividing means for dividing a display area in which a pointer is movable into a predetermined number of regions, the pointer being displayed in the display area on an electronic display device;
    pointer position acquiring means for acquiring a current position of the pointer within the display area;
    region image characteristic acquiring means for determining in which of the divided regions of the display area the pointer is present and acquiring, for each region, an image characteristic of the portion of the image displayed within the region; and
    moving speed computing means for calculating, for each region, a speed scale-factor for the pointer based on the image characteristic of the portion of the image displayed within the region, wherein the image characteristic of the portion of the image presently displayed within a region is used in the calculation of the speed-scale factor for the region, and setting, as a moving speed in the present region, a normal moving speed of the pointer multiplied by the speed scale-factor of the present region, wherein the moving speed of the pointer for each region is the normal moving speed multiplied by the speed scale-factor.

12. The apparatus according to claim 11, wherein the image characteristic is a histogram distribution of an image in the present region, a high frequency component of the image in the present region, the high frequency component determined using a discrete cosine transformation ("DCT"), the number of text characters displayed in the present region or the number of objects displayed in the present region.

13. The apparatus according to claim 12, further comprising:
    means for displaying a window for selecting as the image characteristic one or more of the histogram distribution of the image in the present region, the high frequency component of the image in the present region, the number of text characters displayed in the present region and the number of objects displayed in the present region.

14. The apparatus according to claim 11, further comprising:
    means for asymptotically bringing the moving speed of the pointer to the moving speed in the present region in a case where the moving speed of the pointer in a region the pointer has been present before entering the present region differs from the moving speed in the present region.

15. The apparatus according to claim 11, further comprising:
    means for visualizing the speed scale-factors in the predetermined number of regions and displaying the speed scale-factors.

16. The apparatus according to claim 15, wherein the means for visualizing and displaying the speed scale-factors is means for changing a display attribute in accordance with the magnitude of the speed scale-factor.

17. The apparatus according to claim 16, further comprising:
change accepting means for changing the speed scale-factor in response to an instruction from a user.

18. The apparatus according to claim 16, further comprising:
means for detecting a current direction of movement of the pointer,
wherein the means for changing the display attribute comprises means for determining a position the pointer moving at the current pointer moving speed from the current position is reachable in a predetermined time and a region containing the position and displaying a shortest route to the reachable position in the region in the form of a line segment.

19. A computer program product for controlling movements of a pointer, the computer program product comprising a computer readable storage medium having program instructions embodied therewith, the program instructions executable by a processor for:
dividing a display area in which a pointer is movable into a predetermined number of regions, the pointer being displayed in the display area on an electronic display device;
acquiring a current position of the pointer within the display area;
determining in which of the divided regions of the display area the pointer is present (hereinafter referred to as a present region);
calculating, for each region, a speed scale-factor for the pointer based on an image characteristic of the portion of the image displayed within the region, wherein the image characteristic of the portion of the image presently displayed within a region is used in the calculation of the speed-scale factor for the region; and
setting, as a moving speed in the present region, a normal moving speed of the pointer multiplied by the speed scale-factor of the present region, wherein the moving speed of the pointer for each region is the normal moving speed multiplied by the speed scale-factor.

20. The computer program product of claim 19, wherein the image characteristic is one or more of a histogram distribution of an image in the present region, a high frequency component of the image in the present region, the high frequency component determined using a discrete cosine transformation ("DCT"), the number of text characters displayed in the present region and the number of objects displayed in the present region.

* * * * *